United States Patent
Suzuki (10) Patent No.: US 9,306,483 B2
(45) Date of Patent: Apr. 5, 2016

(54) MOTOR CONTROL DEVICE

(71) Applicant: Haruyuki Suzuki, Kanagawa (JP)

(72) Inventor: Haruyuki Suzuki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 134 days.

(21) Appl. No.: 14/284,900

(22) Filed: May 22, 2014

(65) Prior Publication Data
US 2014/0354202 A1 Dec. 4, 2014

(30) Foreign Application Priority Data

May 30, 2013 (JP) ................................ 2013-114496

(51) Int. Cl.
| | | |
|---|---|---|
| *G05B 11/00* | (2006.01) | |
| *G05B 6/00* | (2006.01) | |
| *H02P 7/28* | (2006.01) | |
| *G03G 15/00* | (2006.01) | |
| *H02P 23/00* | (2006.01) | |
| *H02P 6/16* | (2006.01) | |

(52) U.S. Cl.
CPC .............. *H02P 7/28* (2013.01); *G03G 15/5008* (2013.01); *H02P 23/0004* (2013.01); *H02P 6/16* (2013.01)

(58) Field of Classification Search
CPC ........... H02P 6/16; H02P 21/146; G05B 6/02; G05B 11/36; G05B 13/0245; G05B 11/42; G05B 2219/41152; G01B 7/30; G01D 5/2451
USPC ......................................... 318/461, 609, 610
See application file for complete search history.

(56) References Cited

U.S. PATENT DOCUMENTS

| | | | | | |
|---|---|---|---|---|---|
| 5,482,129 | A | * | 1/1996 | Shimizu ............... | B62D 5/0463 180/446 |
| 6,469,467 | B1 | * | 10/2002 | Fujita ................... | G05B 19/416 318/568.18 |
| 7,759,887 | B2 | * | 7/2010 | Kiryu ................... | G03B 17/425 318/400.24 |
| 8,351,824 | B2 | | 1/2013 | Maeda | |
| 8,452,211 | B2 | | 5/2013 | Maeda | |
| 9,024,566 | B2 | * | 5/2015 | Ikeda ..................... | G05B 11/42 318/609 |

(Continued)

FOREIGN PATENT DOCUMENTS

| | | |
|---|---|---|
| EP | 2284617 A1 | 2/2011 |
| JP | 2009-148082 | 7/2009 |
| JP | 2012-244856 | 12/2012 |

OTHER PUBLICATIONS

Extended European Search Report dated Dec. 18, 2014 issued in corresponding European Application No. 14170490.8.

*Primary Examiner* — Rita Leykin
(74) *Attorney, Agent, or Firm* — Harness, Dickey & Pierce, P.L.C.

(57) ABSTRACT

A motor control device controls a speed of a motor. The motor control device includes: a target speed generating unit that generates a target speed; a speed detecting unit that detects a current speed of the motor; a speed comparing unit that compares the target speed with the current speed to calculate a speed error; an error amplifying unit that amplifies the speed error and outputs a control value; and a motor driving unit that drives the motor in accordance with the control value. The error amplifying unit has proportional integral characteristics by which the speed error is amplified with a proportional gain and integration is performed in a lower frequency range than an integral corner frequency, increases the proportional gain as the current speed is higher, and shifts the integral corner frequency to a lower frequency as the current speed is higher.

7 Claims, 10 Drawing Sheets

(56) References Cited

U.S. PATENT DOCUMENTS

| | | |
|---|---|---|
| 2009/0153091 A1 | 6/2009 | Tsujimoto et al. |
| 2010/0142979 A1 | 6/2010 | Atarashi |
| 2011/0026969 A1 | 2/2011 | Maeda |
| 2011/0150530 A1 | 6/2011 | Takahashi et al. |
| 2012/0068643 A1 | 3/2012 | Suzuki |
| 2012/0306419 A1 | 12/2012 | Suzuki |
| 2013/0078021 A1 | 3/2013 | Sakamoto et al. |
| 2013/0082190 A1* | 4/2013 | Momoi ............... H01J 37/20 250/442.11 |
| 2013/0084104 A1 | 4/2013 | Maeda |
| 2013/0099708 A1 | 4/2013 | Shimizu et al. |
| 2013/0106326 A1 | 5/2013 | Kamatani et al. |
| 2013/0106327 A1 | 5/2013 | Kamatani et al. |
| 2013/0257341 A1 | 10/2013 | Suzuki et al. |

* cited by examiner

MOTOR CONTROL DEVICE

CROSS-REFERENCE TO RELATED APPLICATIONS

The present application claims priority to and incorporates by reference the entire contents of Japanese Patent Application No. 2013-114496 filed in Japan on May 30, 2013.

BACKGROUND OF THE INVENTION

1. Field of the Invention

The present invention relates to a motor control device.

2. Description of the Related Art

There is known a direct current (DC) motor that rotates at a rotation speed proportional to an applied voltage. As a kind of such a DC motor, there are known a brush motor and a brushless motor. The brushless motor is free from brush wear and has high durability, and is thus used frequently. Under feedback control using a position/speed sensor of an encoder, and other components, the DC motors are controlled to stop (speed zero) at arbitrary timing or controlled to an arbitrary target speed.

Japanese Laid-open Patent Publication No. 2009-148082 discloses an image forming apparatus that aims at improving image quality by adjusting (tuning) a gain to an appropriate value. In the image forming apparatus, an error detection unit determines whether a frequency error exists. When a frequency error exists, the error detection unit further determines whether the frequency error is within a target error range. When the frequency error is within the target error range, a gain (P gain) of a proportional term of proportional integral control is reduced. When the frequency error is not within the target error range, the P gain is increased. The frequency proportion integral and differential (PID) arithmetic processing is performed based on the set gain.

However, the response characteristics (change of a revolving speed in accordance with an applied voltage) of the DC motors such as a brushless motor change significantly depending on a rotation speed. When the rotation speed is changed, the total feedback characteristics are also changed. Thus, when the rotation speed is controlled using a fixed feedback gain, for example, it is difficult to stably control a rotation speed in a wide range.

Moreover, in the case of the image forming apparatus disclosed in Japanese Laid-open Patent Publication No. 2009-148082, the proportional gain is variable in accordance with a target rotation speed. Thus, when the motor is not rotated at a speed around a target rotation speed, the rotation can be instable. The gain corresponding to the rotation speed is determined considering only rotation fluctuation. Therefore, it is difficult to optimize response characteristics (quickness in following when a target speed is changed) and stability.

In view of the above, there is a need to provide a motor control device capable of controlling a rotation speed of a motor stably and optimally.

SUMMARY OF THE INVENTION

It is an object of the present invention to at least partially solve the problems in the conventional technology.

A motor control device controls a speed of a motor. The motor control device includes: a target speed generating unit that generates a target speed; a speed detecting unit that detects a current speed of the motor; a speed comparing unit that compares the target speed with the current speed to calculate a speed error; an error amplifying unit that amplifies the speed error and outputs a control value; and a motor driving unit that drives the motor in accordance with the control value. The error amplifying unit has proportional integral characteristics by which the speed error is amplified with a proportional gain and integral is performed in a lower frequency range than an integral corner frequency, increases the proportional gain as the current speed is higher, and shifts the integral corner frequency to a lower frequency as the current speed is higher.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes the embodiments of the motor control device in detail with reference to the enclosed drawings.

First Embodiment

Figure 1:
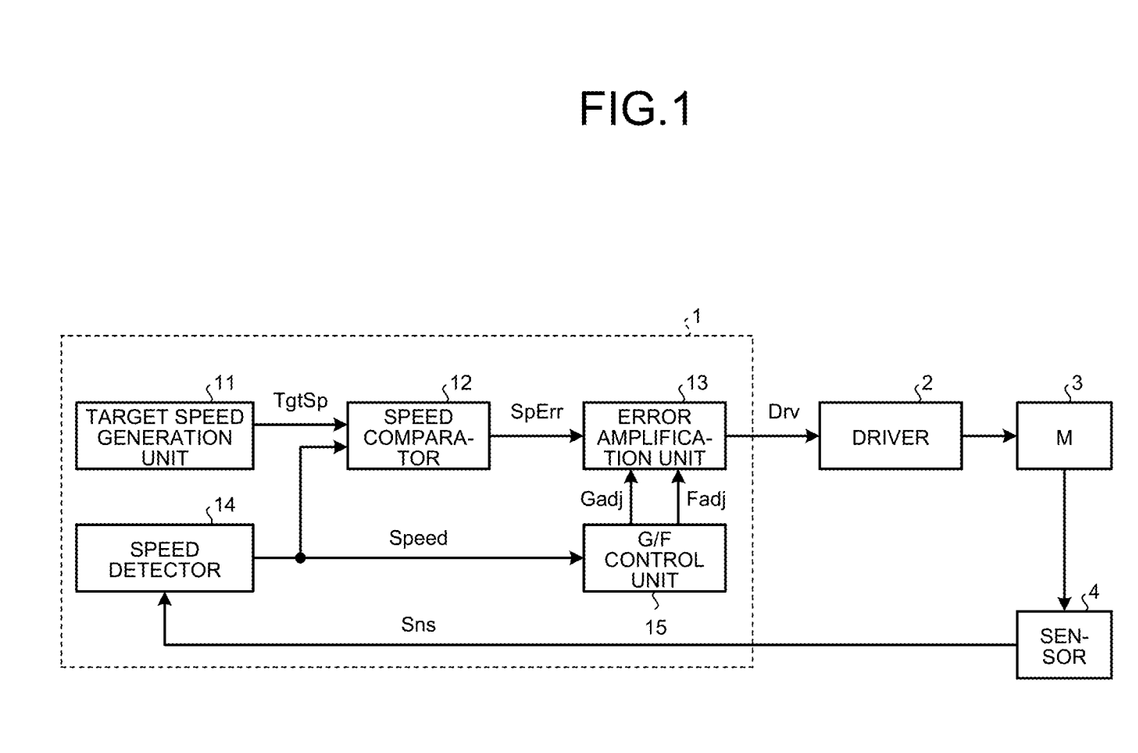
FIG. 1 is a block diagram illustrating a motor control device of a first embodiment.

FIG. 1 is a block diagram illustrating a motor control device of the first embodiment. As illustrated in FIG. 1, the motor control device of the first embodiment includes a controller 1, a driver 2, a brushless DC motor (M) 3, and a sensor 4. The controller 1 includes a target speed generation unit 11, a speed comparison unit 12, an error amplification unit 13, a speed detector 14, and a gain/corner frequency control unit (G/F control unit) 15. The target speed generation unit 11 is an example of a target speed generating unit. The speed detector 14 is an example of a speed detecting unit. The speed comparison unit 12 is an example of a speed comparing unit. The error amplification unit 13 is an example of an error amplifying unit. The driver 2 is an example of a motor driving unit.

The target speed generation unit 11 outputs a certain target value (target speed TgtSp) corresponding to a motor speed used in the motor control device of the first embodiment. To be more specific, the target speed TgtSp may be constant. In the case of a position determination system that moves the brushless DC motor 3 by a certain distance, the target speed TgtSp changing continuously from zero to a given speed is used. Furthermore, the target speed TgtSp may be generated in accordance with the result of comparison between a target position and the current position of the brushless DC motor 3. As mentioned above, various kinds of target speed generation unit 11 can be used. In the embodiment, a certain target speed TgtSp is generated.

The speed detector 14 detects the current speed of the brushless DC motor 3 and outputs a speed value Speed. The motor speed is measured by the sensor 4 attached to the brushless DC motor 3 or a component driven by the brushless DC motor 3. The speed comparison unit 12 compares the target speed TgtSp with the current speed value Speed and outputs the difference as a speed error signal SpErr. The error amplification unit 13 has a gain and includes an integration unit providing integral characteristics at least at a given frequency or lower. The error amplification unit 13 amplifies the speed error signal SpErr, and generates and outputs a control value Drv corresponding to a drive voltage of the brushless DC motor 3. The detail will be described later.

The G/F control unit 15 variably controls a proportional gain and a corner frequency of the error amplification unit 13. That is, the G/F control unit 15 outputs, in accordance with the current speed value Speed, a gain variable amount Gadj for variably controlling a proportional gain in the error amplification unit 13, and a corner frequency variable amount Fadj for variably controlling a frequency (corner frequency) that is a base point of integral or differential characteristics. The detail will be described later.

The driver 2 is what is called a motor drive circuit. The driver 2 rotationally drives the brushless DC motor 3 through an electromagnetic coil with a motor drive voltage proportional to a control value Drv from the error amplification unit 13. Thus, the brushless DC motor 3 rotates at a speed proportional to the control value Drv. The rotation speed of the brushless DC motor 3 fluctuates due to a load (not illustrated) or other factors. Usually, in order to correct fluctuation of the rotation speed, the current rotation speed of the brushless DC motor 3 is fed back to the controller 1 to perform control so that the rotation speed of the brushless DC motor 3 is constant.

The sensor 4 is a position sensor or a speed sensor. The sensor 4 detects a rotation position or a rotation speed of the brushless DC motor 3 and outputs a sensor signal Sns. As the sensor 4, a component that outputs pulse or angle information in accordance with a motor rotation angle, such as an encoder and a resolver, can be used.

Depending on an output form of the sensor 4, the speed detector 14 of various configurations can be used. For example, when the sensor 4 outputs a speed signal, the speed detector 14 converting a speed signal into a value Speed can be used. When the sensor 4 outputs position information, the speed detector 14 converting position information into speed information by differentiation, for example, can be used. When the sensor 4 outputs pulses of a frequency proportional to a speed, it is possible to use the speed detector 14 counting the pulse period or the number of pulses and detecting a rotation speed of the brushless DC motor 3 based on temporal variation of the pulses.

Figure 2:
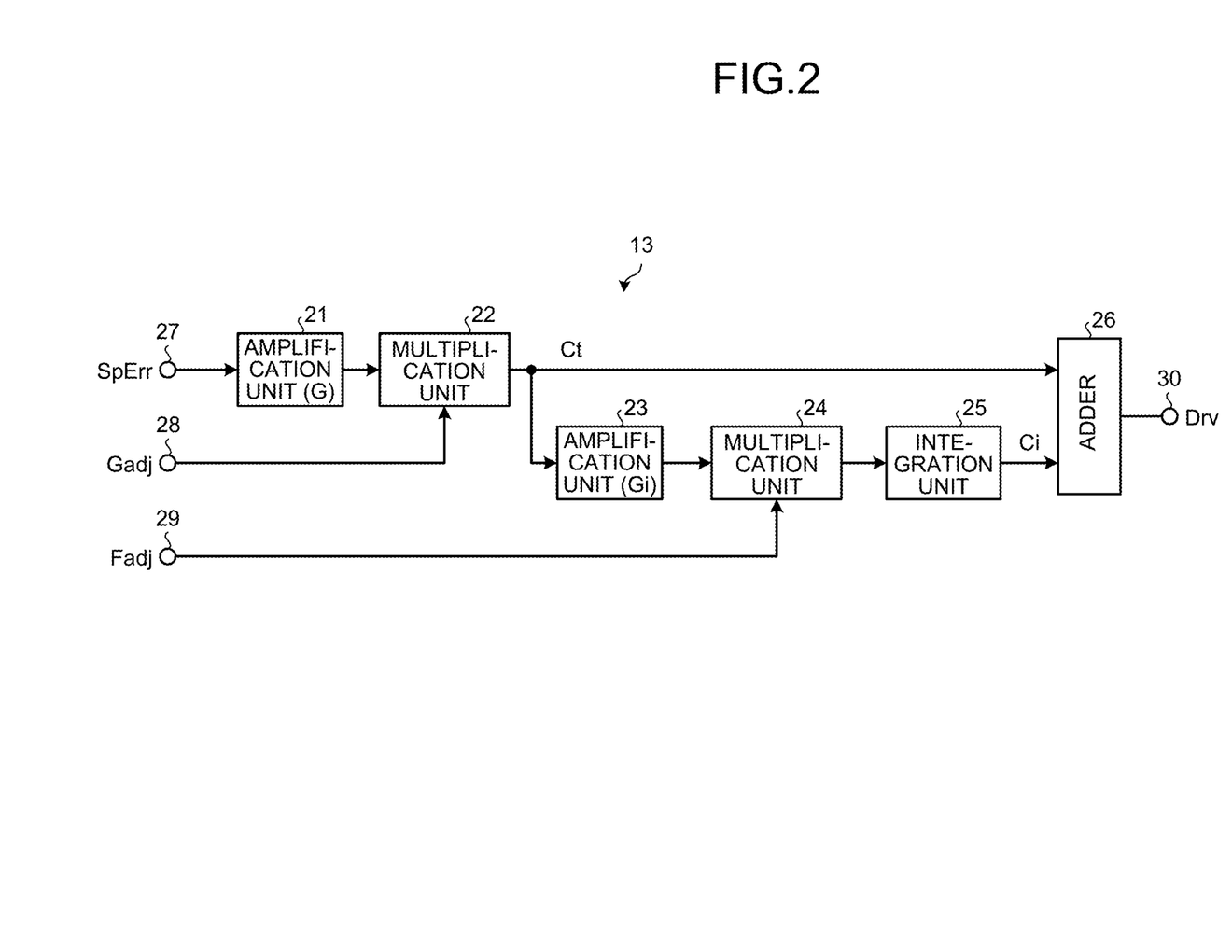
FIG. 2 is a block diagram illustrating an error amplification unit provided in the motor control device of the first embodiment.

FIG. 2 is a block diagram illustrating the error amplification unit 13. The error amplification unit 13 includes an amplification unit 21, a multiplication unit 22, an amplification unit 23, a multiplication unit 24, an integration unit 25, and an adder 26. The amplification unit 21 is a gain factor, and amplifies a speed error signal SpErr with a fixed amplification factor G, the speed error signal SpErr being supplied through an input terminal 27. The multiplication unit 22 is a gain variable factor, and generates a control value Ct by multiplying the speed error signal SpErr amplified with the fixed amplification factor G by the gain variable amount Gadj supplied through an input terminal 28 and outputs the control value Ct. That is, "control value Ct=speed error signal SpErr× fixed amplification factor G×gain variable amount Gadj" is established.

The amplification unit 23 is a gain factor, and amplifies the control value Ct with a fixed amplification factor Gi. The multiplication unit 24 is a gain variable factor, and multiplies the control value Ct amplified with the fixed amplification factor Gi by a corner frequency variable amount Fadj supplied through an input terminal 29. The integration unit 25 integrates the control value Ct multiplied by the corner frequency variable amount Fadj to output a control value Ci. The adder 26 adds the control value Ct from the multiplication unit 22 and the control value Ci from the integration unit 25 to generate a control value Drv. The control value Drv is supplied to the driver 2 through an output terminal 30.

Figure 3:
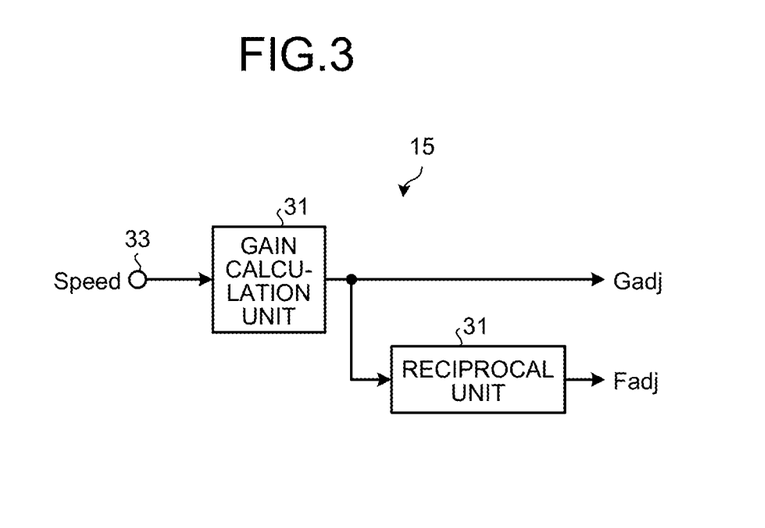
FIG. 3 is a block diagram illustrating a gain/corner frequency control unit (G/F control unit) provided in the motor control device of the first embodiment.

FIG. 3 illustrates a block diagram of the G/F control unit 15. The G/F control unit 15 includes a gain calculation unit 31 and a reciprocal unit 32. The gain calculation unit 31 outputs a gain variable amount Gadj calculated using a speed value Speed of the current rotation of the brushless DC motor 3, a coefficient A that is a value of an inclination coefficient, and a coefficient B that is a value of an intercept. That is, the gain calculation unit 31 calculates and outputs a gain variable amount Gadj using the expression "gain variable amount Gadj=coefficient A×speed value Speed+coefficient B".

The reciprocal unit 32 outputs a reciprocal of a gain variable amount Gadj as a corner frequency variable amount Fadj. That is, the reciprocal unit 32 calculates a corner frequency variable amount Fadj using the expression "corner frequency variable amount Fadj=1/gain variable amount Gadj" and outputs it. The motor control device of the embodiment determines the coefficient A and the coefficient B in accordance with the motor characteristics. Thus, variations of control performance and stability due to motor characteristics can be cancelled, which enables stable and optimum rotation control of the brushless DC motor 3.

Figure 4:
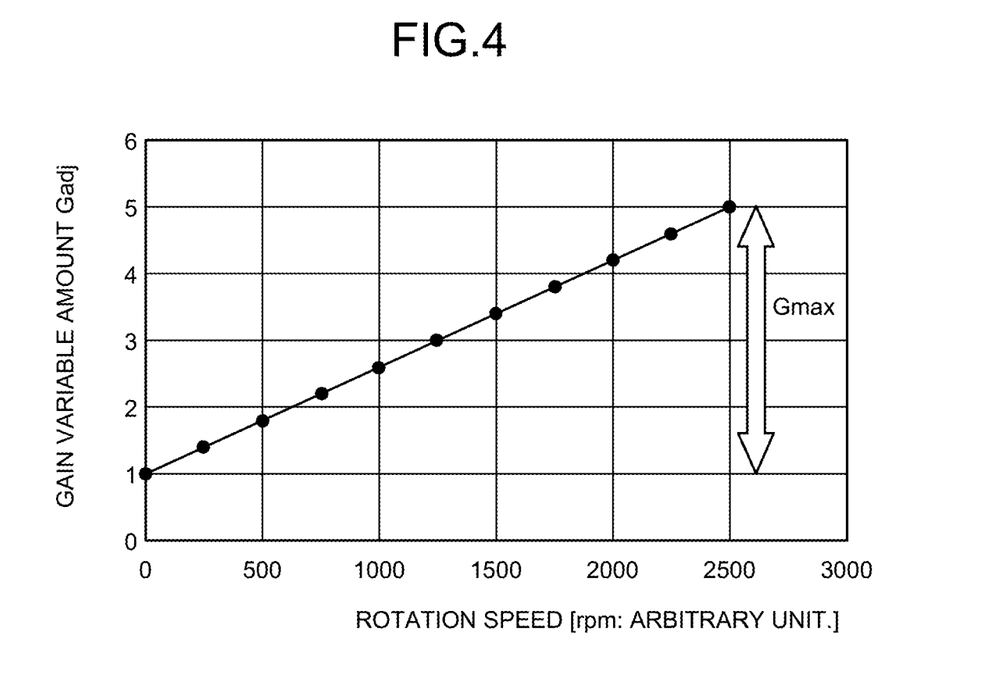
FIG. 4 is a graph illustrating the relation between a gain variable amount generated by the G/F control unit and a rotation speed of the brushless DC motor.

As an example, FIG. 4 is a graph illustrating the relation between the gain variable amount Gadj generated by the G/F control unit 15 and the rotation speed of the brushless DC motor 3. The scale of the rotation speed, which is indicated by a horizontal axis of the graph in FIG. 4, is arbitrary, and is revolutions per minute (rpm), for example. The coefficient A and the coefficient B are determined reflecting a variation amount of a later-described mechanical time constant Tm of the brushless DC motor 3 depending on a rotation speed. For example, in the case of the brushless DC motor 3 in which the mechanical time constant when the rotation speed is 2500 rpm is five times as much as the mechanical time constant when the rotation is stopped, "coefficient A=5/2500" and "coefficient B=1" are established.

Figure 5:
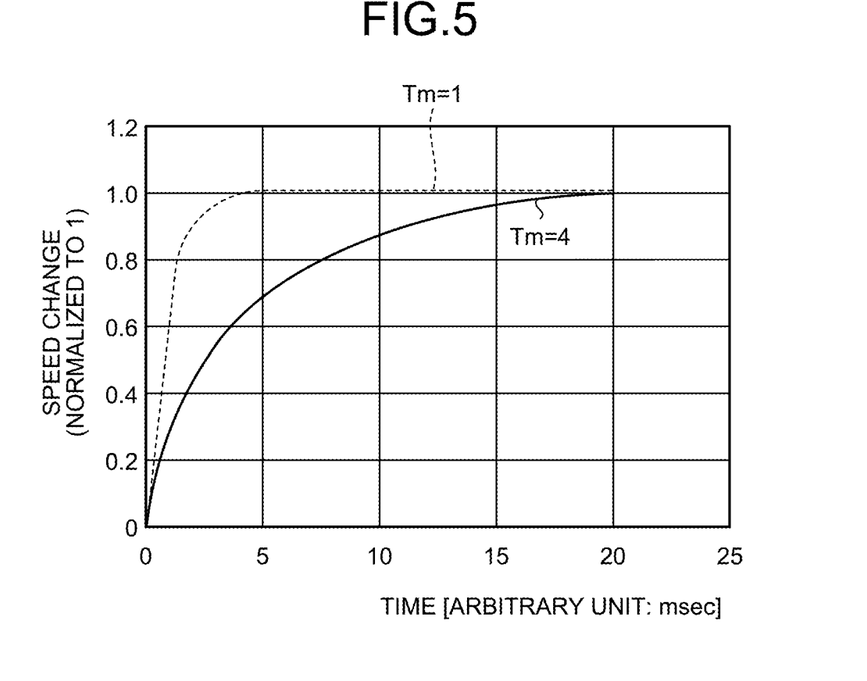
FIG. 5 is a graph illustrating the relation between step response and a mechanical time constant of the brushless DC motor.

The graph in FIG. 5 illustrates the relation between step response and the mechanical time constant Tm of the brushless DC motor 3. The step response is indicated by plotting motor speeds changing due to stepwise change in an input voltage Vc of the brushless DC motor 3. The horizontal axis of the graph in FIG. 5 is a time axis. The scale of the horizontal axis is arbitrary, and is millisecond, for example. The vertical axis of the graph in FIG. 5 is a motor speed obtained by normalizing a motor speed variation amount between before and after step voltage application to "1". The time at which the normalized speed change amount reaches 0.63 is "mechanical time constant Tm".

The dotted line graph in FIG. 5 is obtained by plotting motor speeds when the initial rotation speed is low, and the mechanical time constant Tm in this time is Tm=1. The solid line graph in FIG. 5 is obtained by plotting motor speeds when the initial rotation speed is high, and the mechanical time constant Tm in this time is Tm=4. According to FIG. 5, in the brushless DC motor 3, the mechanical time constant Tm is larger (=slower in response) as the initial rotation speed (rotation speed before step voltage application) is higher.

Figure 6:
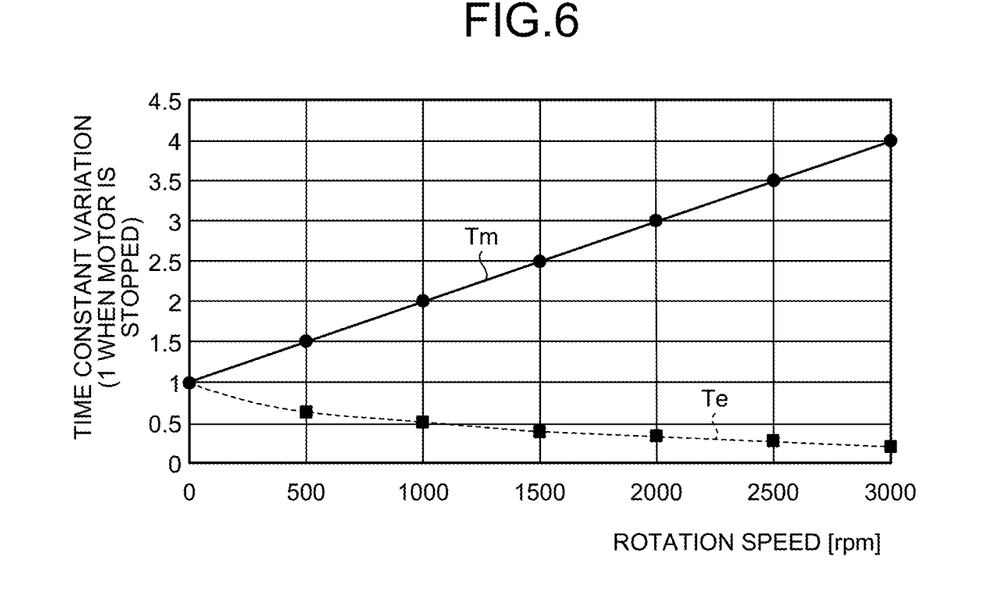
FIG. 6 is a graph illustrating plotted mechanical time constants with different initial rotation speeds of the brushless DC motor.

FIG. 6 is a graph illustrating plotted mechanical time constants Tm with different initial rotation speeds of the brushless DC motor 3. In the graph in FIG. 6, the mechanical time constant Tm when the motor stops is normalized to one. As can be seen from the graph of FIG. 6, the mechanical time constant Tm increases linearly with respect to the rotation speed of the brushless DC motor 3. The inclination of the straight line is different depending on a model (kind) of the motor. Thus, it is preferable to perform such plotting for each model of motors to obtain basic data. The inclination of the straight line of the gain variable amount Gadj is determined depending on a change rate of the mechanical time constant Tm with respect to the rotation speed of the brushless DC motor 3.

The coefficient A and the coefficient B can be obtained based on the basic data illustrated in the graph of FIG. 6 and the variable expression of the gain variable amount Gadj illustrated in FIG. 4 (gain variable amount Gadj=coefficient A×speed value Speed+coefficient B). The G/F control unit is configured using this.

Figure 7:
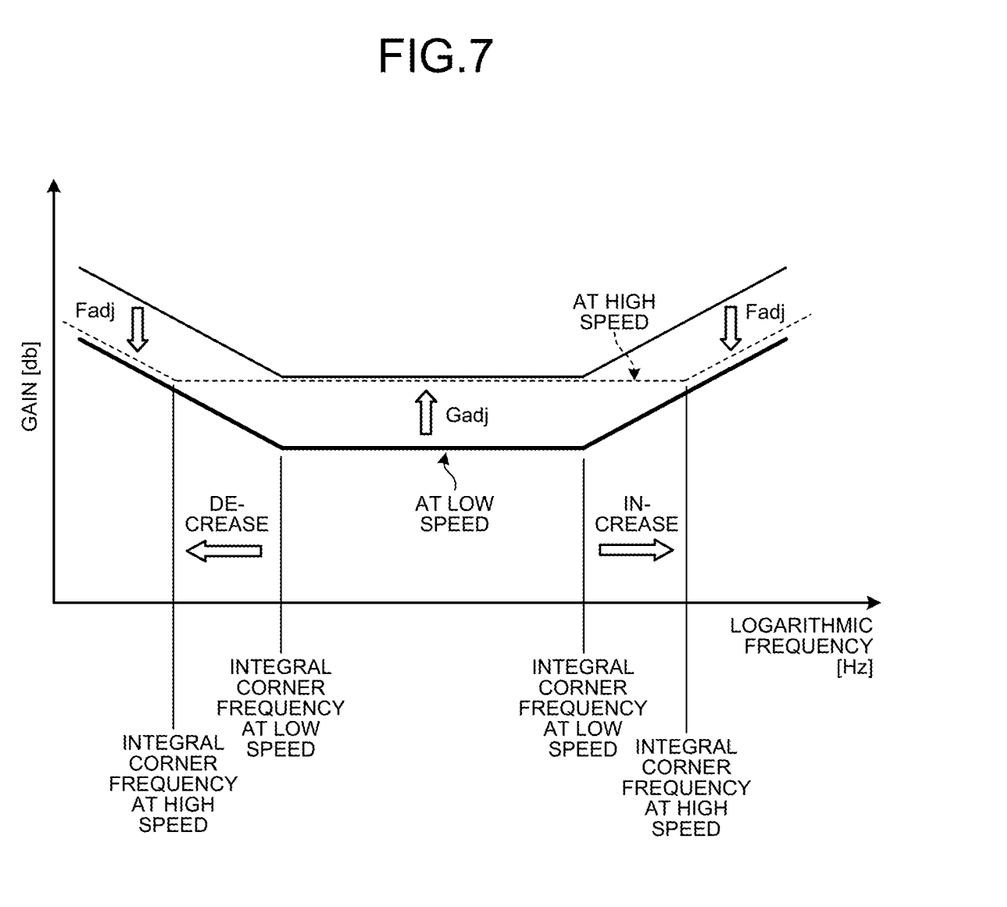
FIG. 7 is a Bode diagram illustrating frequency characteristics when the error amplification unit is controlled using a gain variable amount and a corner frequency variable amount from the G/F control unit.

FIG. 7 illustrates a frequency characteristic Bode diagram when the error amplification unit 13 is controlled using a gain variable amount Gadj and a break frequency variable amount Fadj from the G/F control unit 15. The Bode diagram is obtained by plotting gains from input to output with a frequency as a horizontal axis. The frequency is indicated with a logarithmic scale, and the gain is indicated with dB (logarithmic value of gain×20). The use of the logarithmic scale allows approximation of gains with a substantially straight line. The frequency at which a straight line is bent is referred to as a corner frequency.

As can be seen from FIG. 7, the error amplification unit 13 has integral characteristics by which the gain increases in a lower frequency range than an integral corner frequency (integral corner) and, in a higher frequency range than an integral corner frequency, the gain is flat. In FIG. 7, the Bode diagram when the rotation speed of the brushless DC motor 3 is low (at a low speed) is illustrated with a bold solid line. When the rotation speed of the brushless DC motor 3 is higher (at a high speed), the gain variable amount Gadj is increased, and the corner frequency variable amount Fadj is decreased. Thus, at a high speed, the gain in a flat portion is increased and the integral corner frequency is decreased, as illustrated in the Bode diagram of dotted line in FIG. 7.

The gain is only increased over all only by increasing the gain variable amount Gadj, as illustrated in the Bode diagram of a fine line in FIG. 7. This cannot compensate a change of the mechanical time constant Tm. Thus, the G/F control unit 15 supplies a corner frequency variable amount Fadj to the error amplification unit 13 so as to decrease the integral corner frequency. In this manner, the error amplification unit 13 obtains characteristics corresponding to a rotation speed, whereby the rotation speed dependency of a motor time constant can be cancelled, which enables stable and optimal rotation control in accordance with a rotation speed.

As is clear from the above description, in the motor control device of the first embodiment, the error amplification unit 13 has proportional integral characteristics by which the speed error signal SpErr is amplified with a given proportional gain (gain variable amount Gadj) and integration is performed in the lower frequency range than a given integral corner frequency. The G/F control unit 15 controls the error amplification unit 13 to increase a proportional gain (gain variable amount Gadj) and shift the integral corner frequency to a lower frequency as the current rotation speed of the brushless DC motor 3 is higher. In this manner, even when the mechanical response characteristics of the brushless DC motor 3 change depending on a rotation speed, it is possible to perform stable and optimal rotation control of the brushless DC motor 3 without any influence on following control characteristics.

Second Embodiment

The following describes the motor control device of the second embodiment. The motor control device of the above-described first embodiment is provided with the error amplification unit 13 that has proportional integral characteristics by which integration is performed in a lower frequency range than a given integral corner frequency. As the current rotation speed of the brushless DC motor 3 is higher, the error amplification unit 13 increases a proportional gain and shifts the integral corner frequency to a lower frequency. By contrast, the motor control device of the second embodiment is provided with an error amplification unit that has proportional differential characteristics by which differentiation is performed in a higher frequency range than a given differential corner frequency, in addition to the proportional integral characteristics. As the current rotation speed of the brushless DC motor 3 is higher, the error amplification unit increases a proportional gain and shifts the differential corner frequency to a higher frequency. Note that the first embodiment is different from the second embodiment only in this aspect. Therefore, in the following, only the difference between both embodiments is described, and the overlapped description is omitted.

Figure 8:
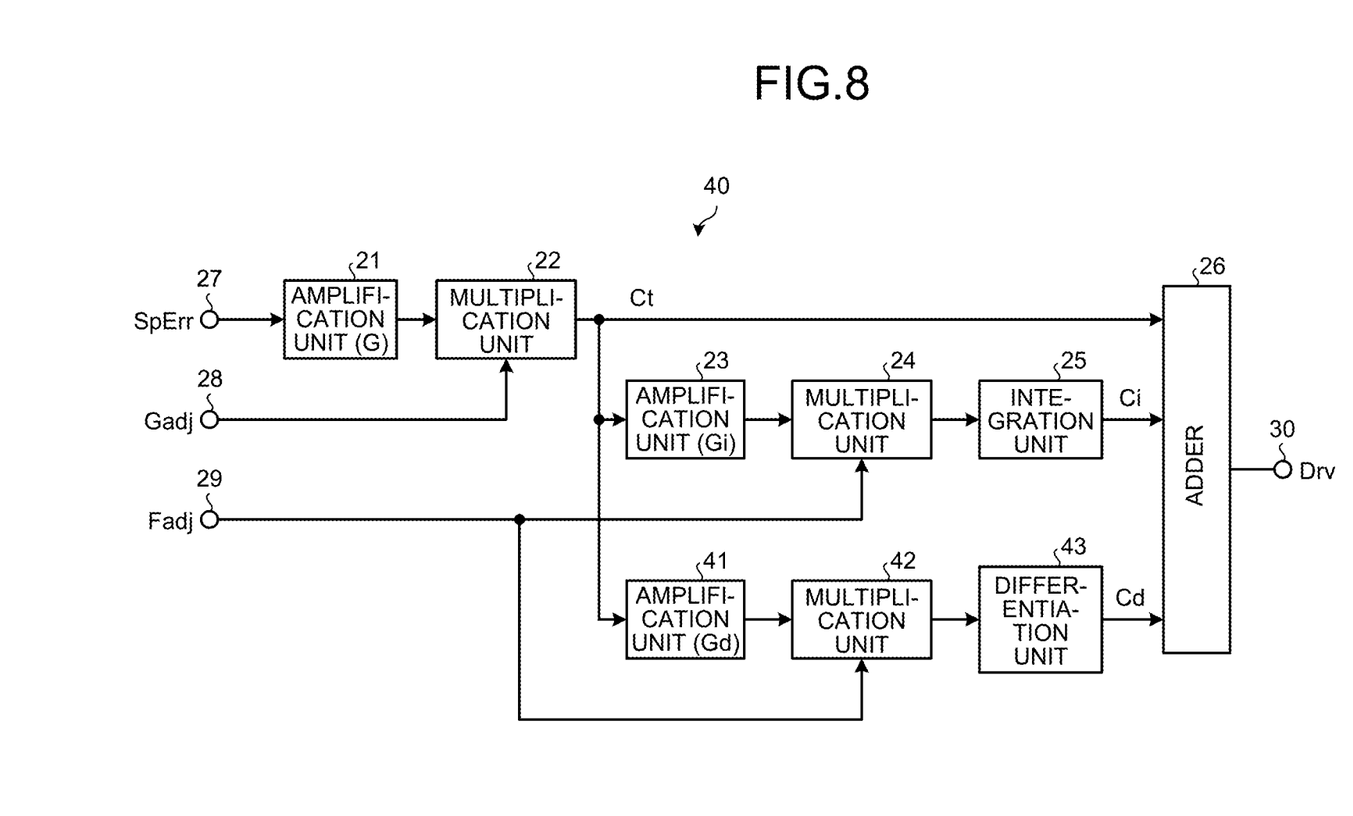
FIG. 8 is a block diagram illustrating an error amplification unit provided in a motor control device of a second embodiment.

FIG. 8 illustrates a block diagram of an error amplification unit 40 provided in a motor control device of the second embodiment. In the error amplification unit 40 illustrated in FIG. 8, the parts performing the same actions as in the error amplification unit 13 illustrated in FIG. 2 are denoted by the same symbols. As can be seen from comparison between FIG. 2 and FIG. 8, the error amplification unit 40 provided in the motor control device of the second embodiment has a configuration further including an amplification unit 41, a multiplication unit 42, and a differentiation unit 43, in addition to the components of the error amplification unit 13.

The amplification unit 41 is a gain factor, and amplifies the control value Ct from the multiplication unit 22 with a fixed amplification factor Gd. The multiplication unit 42 is a gain variable factor, and multiplies the control value Ct amplified with the amplification factor Gd by a corner frequency variable amount Fadj supplied from the G/F control unit 15 through the input terminal 29. The differentiation unit 43 differentiates the control value Ct amplified with the amplification factor Gd and multiplied by the corner frequency variable amount Fadj, and generates a control value Cd. The adder 26 adds the control value Ct from the multiplication unit 22, the control value Ci generated by integration processing, and the control value Cd generated by differentiation processing, and outputs a control value Drv through the output terminal 30.

Such an error amplification unit 40 has proportional differential characteristics by which differentiation is performed in a higher frequency range than a given differential corner frequency, in addition to the proportional integral characteristics described in the first embodiment. That is, the error amplification unit 40 has integral characteristics by which the gain increases in a lower frequency range than an integral corner frequency and differential characteristics by which the gain increases in a higher frequency range than a differential corner frequency, as illustrated in the Bode diagram of FIG. 7. The gain is flat between the integral corner frequency and the differential corner frequency.

The Bode diagram when the rotation speed of the brushless DC motor 3 is low is illustrated with a bold solid line in FIG. 7. When the rotation speed of the brushless DC motor 3 is higher, the gain variable amount Gadj is increased, and the corner frequency variable amount Fadj is decreased. Thus, the gain in a flat portion is increased, and an integral corner frequency is decreased, as illustrated in the Bode diagram of dotted line in FIG. 7. Moreover, when the corner frequency variable amount Fadj is decreased, the gain in the differential characteristic part is decreased, and thus a differential corner frequency is increased.

The differential corner is variable because the electrical time constant Te of the brushless DC motor 3, which is indicated with a dotted line in FIG. 6, decreases as the rotation speed is higher. In general, the brushless motor can be modeled by a second-order lag system having a mechanical time constant Tm determined by inertia, a back electromotive force constant, and coil resistance and an electrical time constant Te determined by coil resistance and inductance.

The mechanical time constant Tm and the electrical time constant Te are not invariable but variable depending on a rotation speed. The electrical time constant Te illustrated in FIG. 6 decreases as the rotation speed is higher, and is proportional to a reciprocal of the mechanical time constant Tm. That is, with the rotation speed at which the mechanical time constant Tm is four times, the electrical time constant Te is ¼. Thus, in the error amplification unit 40 illustrated in FIG. 8, the gain in the differentiation is variable using the corner frequency variable amount Fadj same as in the integration.

In this manner, the rotation speed dependency of the mechanical time constant Tm and the electrical time constant Te of the brushless DC motor 3 can be cancelled, which enables stable and optimal rotation control for each rotation speed. When the differential corner is not changed although the electrical time constant Te actually decreases, the amplification factor in the high frequency range is excessively high, which causes a defect that noise is superposed on a drive waveform and saturation tends to occur. However, such a defect can be prevented by using the variable in the differentiation.

As is clear from the above description, in the motor control device of the second embodiment, the error amplification unit 40 has proportional differential characteristics by which differentiation is performed in a higher frequency range than a given differential corner frequency, in addition to the proportional integral characteristics described above. As the current rotation speed of the brushless DC motor 3 is higher, the error amplification unit 40 increases a proportional gain and shifts the differential corner frequency to a higher frequency. In this manner, even when the electrical response characteristics of the motor are changed depending on the rotation speed of the brushless DC motor 3, it is possible to perform stable and optimal rotation control without any influence on a drive circuit or following control characteristics.

Third Embodiment

The following describes the motor control device of the third embodiment. In the motor control device of the second embodiment described above, the G/F control unit 15 includes the reciprocal unit 32 for generating a corner frequency variable amount Fadj using a gain variable amount Gadj, as described with reference to FIG. 3. By contrast, in the motor control device of the third embodiment, the error amplification unit includes the reciprocal unit for generating a corner frequency variable amount Fadj using a gain variable amount Gadj. Note that the second embodiment is different from the third embodiment only in this aspect. Therefore, in the following, only the difference between both embodiments is described, and the overlapped description is omitted.

Figure 9:
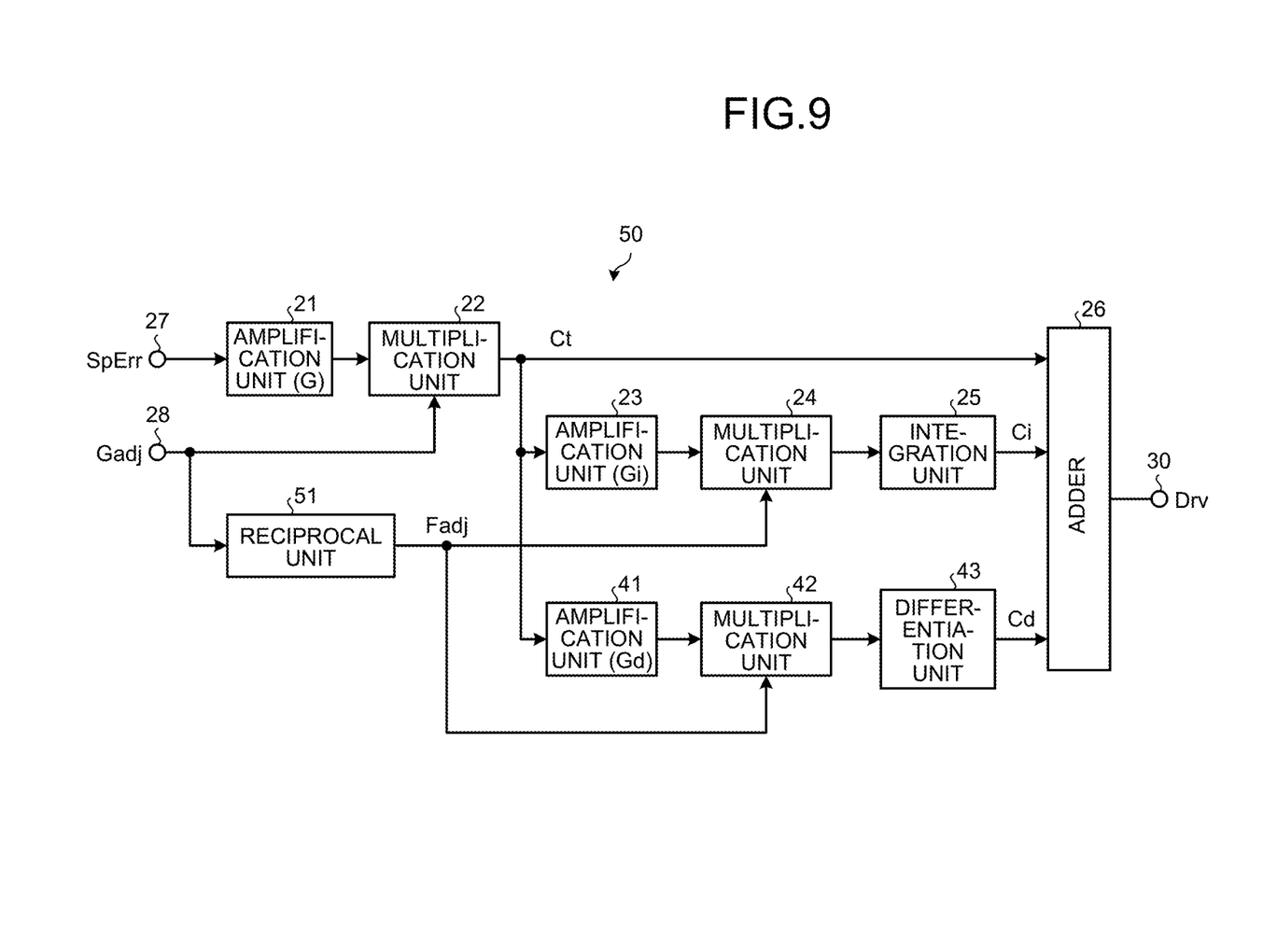
FIG. 9 is a block diagram illustrating an error amplification unit provided in a motor control device of a third embodiment.

FIG. 9 illustrates a block diagram of an error amplification unit 50 provided in the motor control device of the third embodiment. In the error amplification unit 50 illustrated in FIG. 9, the parts performing the same actions as in the error amplification unit 40 illustrated in FIG. 8 are denoted by the same symbols. As can be seen from comparison between FIG. 8 and FIG. 9, a signal line through which a corner frequency variable amount Fadj from the G/F control unit 15 is supplied to the multiplication unit 24 and the multiplication unit 42 is omitted in the error amplification unit 50 provided in the motor control device of the third embodiment. Instead, the error amplification unit 50 includes a reciprocal unit 51 that generates a corner frequency variable amount Fadj using a gain variable amount Gadj supplied from the G/F control unit 15 through the input terminal 28 and supplies the corner frequency variable amount Fadj to the multiplication unit 24 and the multiplication unit 42.

In such a motor control device, the gain variable amount Gadj supplied from the G/F control unit 15 through the input terminal 28 is supplied to the multiplication unit 22 and the reciprocal unit 51. The reciprocal unit 51 generates the corner frequency variable amount Fadj by calculating a reciprocal of the gain variable amount Gadj, and supplies the corner frequency variable amount Fadj to the multiplication unit 24 and the multiplication unit 42.

Such a motor control device of the third embodiment has a configuration in which the error amplification unit 50 includes the reciprocal unit 51 for generating a corner frequency variable amount Fadj using a gain variable amount Gadj. Therefore, it is possible to omit the reciprocal unit 32 of the G/F control unit 15, and obtain the same effects as in the embodiments described above.

Fourth Embodiment

The following describes the motor control device of the fourth embodiment. In the motor control device of the embodiments described above, the speed error signal SpErr is amplified with the gain variable amount Gadj, and then integration processing and differentiation processing are performed. By contrast, in the motor control device of the fourth embodiment, there is performed processing of adding "speed error signal SpErr amplified with gain variable amount Gadj", "speed error signal SpErr integrated without amplification with gain variable amount Gadj" and "speed error signal SpErr differentiated without amplification with gain variable amount Gadj". In this manner, only the flat portion between the integral corner frequency and the differential corner frequency, which is illustrated in the Bode diagram of FIG. 7, is variable in a gain variable amount Gadj. Note that the fourth embodiment is different from the above-described embodiments only in this aspect. Therefore, in the following, only the difference between both embodiments is described, and the overlapped description is omitted.

Figure 10:
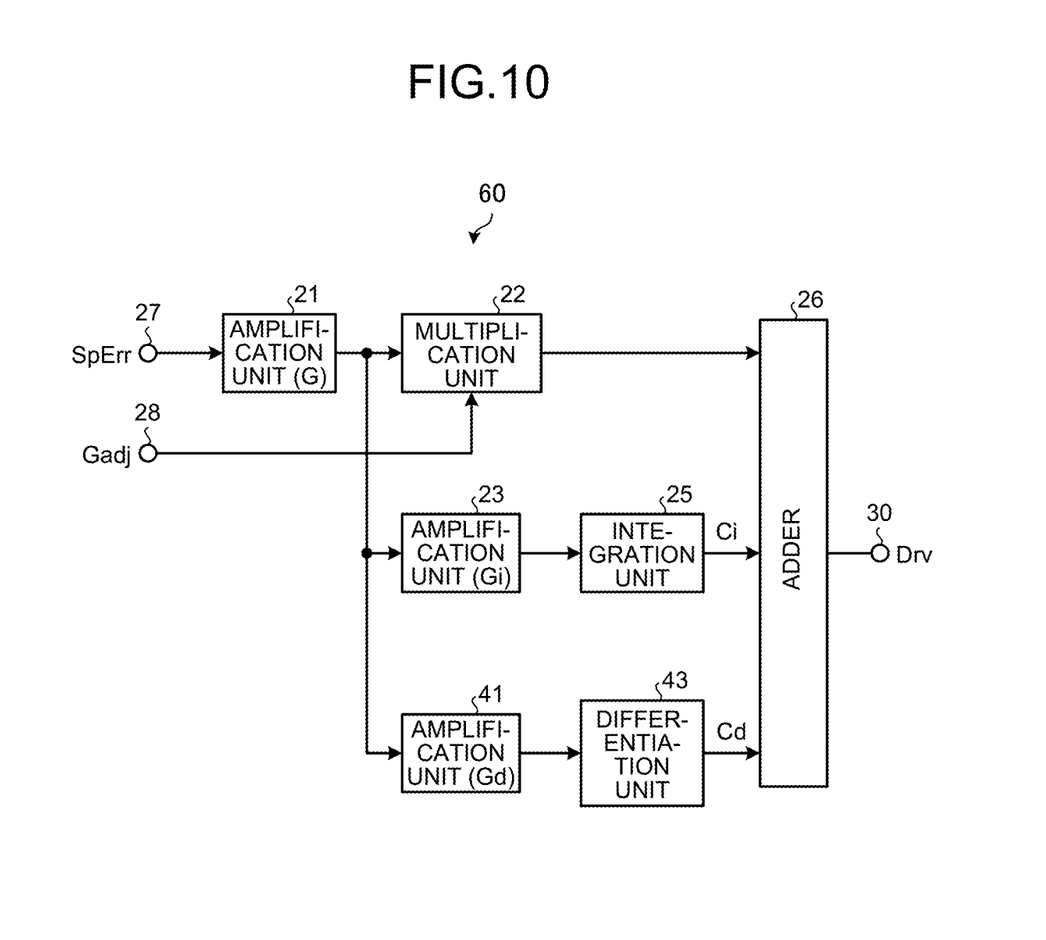
FIG. 10 is a block diagram illustrating an error amplification unit provided in a motor control device of a fourth embodiment.

FIG. 10 illustrates a block diagram of an error amplification unit 60 provided in the motor control device of the fourth embodiment. As illustrated in FIG. 10, the error amplification unit 60 includes the amplification unit 21 and the multiplication unit 22 that amplify speed error signal SpErr with a gain variable amount Gadj and supply them to the adder 26. The error amplification unit 60 includes the amplification unit 23 and the integration unit 25 that integrate the speed error signal SpErr not amplified with a gain variable amount Gadj and supply them to the adder 26. The error amplification unit 60 includes the amplification unit 41 and the differentiation unit 43 that differentiate the speed error signal SpErr not amplified with a gain variable amount Gadj and supply them to the adder 26.

In such an error amplification unit 60, the speed error signal SpErr is distributed to the integration processing part and the differentiation processing part from an input point to the multiplication unit 22 amplifying the speed error signal SpErr with a gain variable amount Gadj. In this manner, only the flat portion between the integral corner frequency and the differential corner frequency, which is illustrated in the Bode diagram of FIG. 7, is variable in a gain variable amount Gadj. That is, even when the gain variable amount Gadj is increased, the gains in the integration processing and the differentiation processing are not changed. Thus, the integral corner frequency illustrated in the Bode diagram of FIG. 7 can be made lower automatically, while the differential corner frequency illustrated therein can be made higher automatically.

Consequently, variable gain factors for changing the corner frequency such as the reciprocal unit 51, the multiplication unit 24, and the multiplication unit 42 that are illustrated in FIG. 9 can be omitted in the motor control device of the fourth embodiment. Therefore, it is possible to achieve easier configuration and lower cost, and obtain the same effects as in the embodiments described above.

Fifth Embodiment

Figure 11:
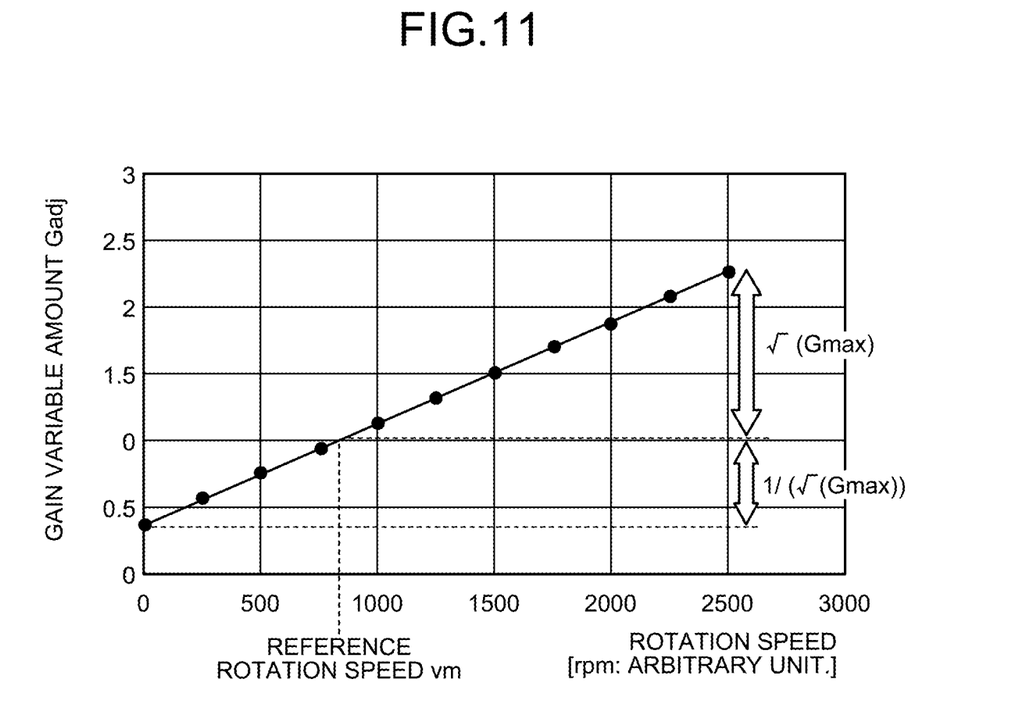
FIG. 11 is a graph illustrating the relation between a gain variable amount generated by a G/F control unit provided in a motor control device of a fifth embodiment and a rotation speed of a brushless DC motor.

The following describes the motor control device of the fifth embodiment. FIG. 11 is a graph illustrating the relation between the gain variable amount Gadj generated by the G/F control unit 15 provided in the motor control device of the fifth embodiment and the rotation speed of the brushless DC motor 3. The scale of the rotation speed, which is indicated by the horizontal axis of the graph in FIG. 11, is arbitrary, and is revolutions per minute (rpm), for example.

The motor control device of the first embodiment linearly increases the gain variable amount Gadj with a certain inclination in accordance with the current speed, with a value when the current speed of the brushless DC motor 3 is zero as a reference. That is, the motor control device of the first embodiment linearly increases the gain variable amount Gadj as the rotation speed of the brushless DC motor 3 is higher with a gain variable amount Gadj when the brushless DC motor 3 stops set to "1", as illustrated in FIG. 4.

By contrast, the motor control device of the second embodiment linearly increases the gain variable amount Gadj with a certain inclination in accordance with the current speed, with a value when the current speed of the brushless DC motor 3 is a certain value as a reference. That is, the motor control device of the fifth embodiment linearly increases the gain variable amount Gadj from the gain variable amount Gadj at an intermediate reference rotation speed vm set to "1", as illustrated in FIG. 11. The inclination of the straight line of the gain variable amount Gadj is determined depending on a change rate of the mechanical time constant Tm with respect to the rotation speed of the brushless DC motor 3, similarly to the first embodiment.

In such a G/F control unit 15 provided in the motor control device of the fifth embodiment, it is preferable that, when the maximum variation amount of the gain variable amount Gadj in a used rotation speed range is Gmax, the reference rotation speed vm be set so as to fulfill Gadj=1 in the geometric average. That is, when the rotation speed range is 0 to vmax, and the variation amount of the gain variable amount Gadj is Gmax times, the reference rotation speed vm is preferably set to "vm=vmax×((($\sqrt{}$(Gmax))−1)/(Gmax−1))".

When the gain variable amount Gadj is "1" at the reference rotation speed vm, the gain variable amount Gadj at the rotation speed vmax is "Gadj=$\sqrt{}$(Gmax)", and the gain variable amount Gadj at the rotation speed 0 is "Gadj=1/($\sqrt{}$(Gmax))". The coefficient A of the G/F control unit 15 is "A=(1/vmax)× (($\sqrt{}$(Gmax))−1)/($\sqrt{}$(Gmax)))". The coefficient B of the G/F control unit 15 is "B=1/($\sqrt{}$(Gmax))". Here, the gains of the error amplification unit 13 (40, 50, or 60), for example, are set in accordance with the motor characteristics (mechanical time constant Tm and electrical time constant Te) when the motor rotation speed is a reference rotation speed vm. The inclination of the straight line of the gain variable amount Gadj is determined depending on a change rate of the mechanical time constant with respect to the rotation speed of the brushless DC motor 3.

With such a configuration, design can be made such that characteristics of the error amplification unit 13, with the gain variable amount Gadj=1, is optimum in the intermediate value of the motor rotation speed range. Thus, even in an inexpensive system in which the gain variable amount Gadj is not variable, adaptation in a wide range of rotation speeds can be achieved. The gains of the error amplification unit 13 (40, 50, or 60) in such a case, for example, are common with the system in which the gain variable amount Gadj is variable. In this manner, the design compatibility among systems is increased, and the use of common parts, for example, makes it possible to manufacture the motor control devices at low costs. Therefore, it is possible to distribute products inexpensive as a whole in the market.

Sixth Embodiment

The following describes the motor control device of the sixth embodiment. In the motor control device of the sixth embodiment, any of the motor control devices of the above-described first to fifth embodiments is assigned to each of motors, so that the rotation control is performed using a gain variable amount Gadj with an inclination of a straight line determined for each model of the motors.

Figure 12:
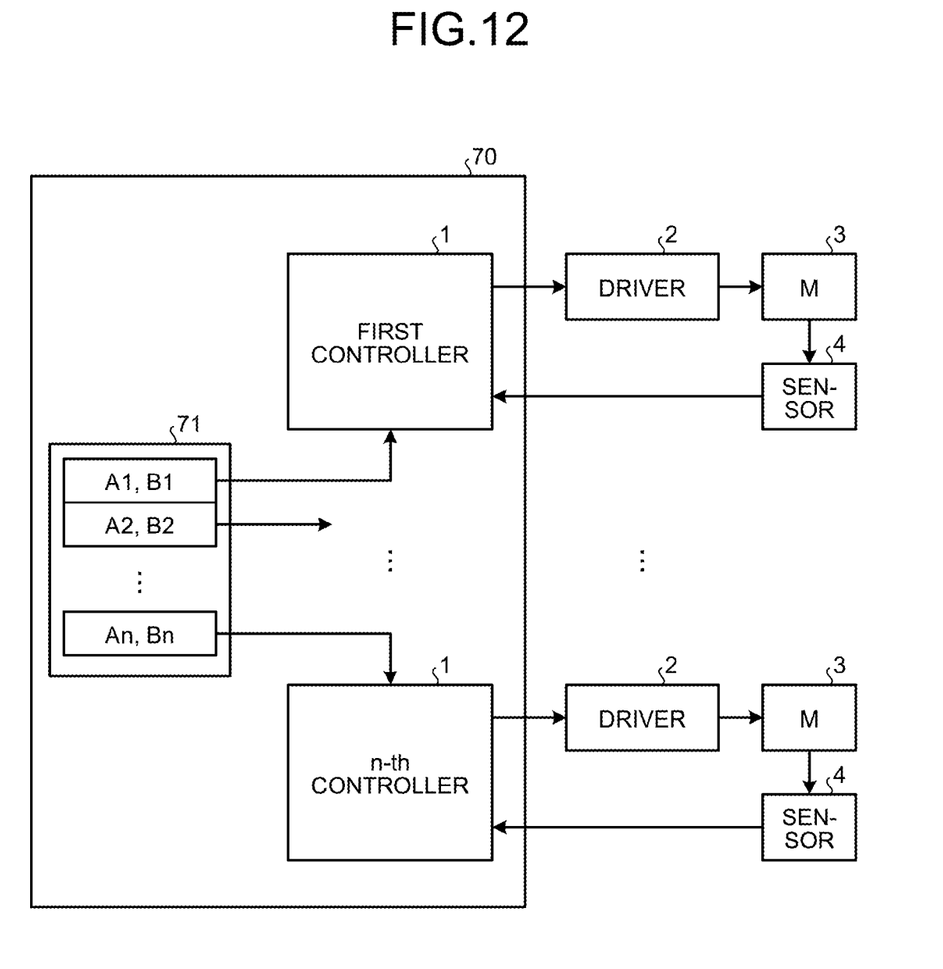
FIG. 12 is a block diagram illustrating a motor control device of a sixth embodiment.

FIG. 12 is a block diagram illustrating a motor control device of the sixth embodiment. In FIG. 12, the parts performing the same actions as in the first embodiment described above are denoted by the same symbols. As illustrated in FIG. 12, the motor control device of the sixth embodiment includes a general controller 70 and a plurality of different models of brushless DC motors 3 that are driven to rotate by the drivers 2 and for which rotation positions and/or the like are detected by the sensors 4.

The general controller 70 includes a plurality of controllers 1 each of which is the same as the controller provided in any of the motor control devices of the above-described first to fifth embodiments. The general controller 70 has the same number of controllers 1 as the number of the brushless DC motors 3. The general controller 70 includes a memory 71. The memory 71 stores, for each brushless motor 3, the coefficient A and the coefficient B of the G/F control unit 15 described above. The characters of "A1, B1" in the memory 71 in FIG. 12 represent the coefficient A and the coefficient B supplied to the first controller 1. Similarly, the characters of "An, Bn" in the memory 71 in FIG. 12 represent the coefficient A and the coefficient B supplied to the n-th controller 1. The "n" is a natural number.

That is, the drivers 2, the brushless DC motors 3, and the sensors 4 have different characteristics. Thus, the memory 71 stores therein the corresponding coefficient A and coefficient B for each brushless DC motor 3. Each controller 1 performs rotation control of the brushless DC motor 3 corresponding thereto, using a gain variable amount Gadj with an inclination corresponding to the coefficient A and the coefficient B for the controller 1.

In this manner, it is possible that the coefficient A and the coefficient B be optimized so as to cancel the rotation speed dependency of the mechanical time constant Tm and the electrical time constant Te of each brushless DC motor 3 and be supplied to the controller 1. Therefore, even when the brushless DC motors 3 different in characteristics (model) coexist, it is possible to perform optimal rotation control and obtain stable control performance. In addition, it is possible to obtain the same effects as in the embodiments described above.

The embodiment provides the effect that a rotation speed of the motor can be controlled stably and optimally.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A motor control device that controls a speed of a motor, the motor control device comprising:
   a target speed generating unit that generates a target speed;
   a speed detecting unit that detects a current speed of the motor;
   a speed comparing unit that compares the target speed with the current speed to calculate a speed error;
   an error amplifying unit that amplifies the speed error and outputs a control value; and
   a motor driving unit that drives the motor in accordance with the control value, wherein
   the error amplifying unit has proportional integral characteristics by which the speed error is amplified with a proportional gain and integration is performed in a lower frequency range than an integral corner frequency, increases the proportional gain as the current speed is higher, and shifts the integral corner frequency to a lower frequency as the current speed is higher.

2. The motor control device according to claim 1, wherein the error amplifying unit further has proportional differential characteristics by which differentiation is performed in a higher frequency range than a differential corner frequency, increases the proportional gain as the current speed is higher, and shifts the differential corner frequency to a higher frequency as the current speed is higher.

3. The motor control device according to claim 1, further comprising a gain variable unit that linearly increases the proportional gain with a certain inclination in accordance with the current speed, with a value when the current speed is zero as a reference.

4. The motor control device according to claim 1, further comprising a gain variable unit that linearly increases the proportional gain with a certain inclination in accordance with the current speed, with a value when the current speed is a certain value as a reference.

5. The motor control device according to claim 3, wherein the inclination is determined depending on a change rate of a mechanical time constant with respect to a rotation speed of the motor.

6. The motor control device according to claim 4, wherein the inclination is determined depending on a change rate of a mechanical time constant with respect to a rotation speed of the motor.

7. A motor control device comprising:
   the motor control device according to claim 3 for each of a plurality of motors, wherein
   the gain variable unit uses the inclination determined for each model of the motors.

* * * * *